(12) United States Patent
Sasaki et al.

(10) Patent No.: US 8,631,946 B2
(45) Date of Patent: Jan. 21, 2014

(54) COMPOSITE SEMIPERMEABLE MEMBRANE AND METHOD FOR PRODUCING SAME

(75) Inventors: Takao Sasaki, Otsu (JP); Tomoko Mitsuhata, Otsu (JP); Kentaro Takagi, Otsu (JP); Katsufumi Oto, Otsu (JP)

(73) Assignee: Toray Industries, Inc., Tokyo (JP)

(*) Notice: Subject to any disclaimer, the term of this patent is extended or adjusted under 35 U.S.C. 154(b) by 0 days.

(21) Appl. No.: 13/508,704

(22) PCT Filed: Dec. 16, 2010

(86) PCT No.: PCT/JP2010/072626
§ 371 (c)(1),
(2), (4) Date: Jun. 8, 2012

(87) PCT Pub. No.: WO2011/078047
PCT Pub. Date: Jun. 30, 2011

(65) Prior Publication Data
US 2012/0248027 A1 Oct. 4, 2012

(30) Foreign Application Priority Data
Dec. 24, 2009 (JP) ................. 2009-291998

(51) Int. Cl.
B01D 39/00 (2006.01)
B01D 39/14 (2006.01)
B01D 29/00 (2006.01)
B01D 29/46 (2006.01)

(52) U.S. Cl.
USPC ............. 210/500.38; 210/500.1; 210/500.21; 210/500.27; 210/500.37; 210/490; 427/244; 427/245

(58) Field of Classification Search
None
See application file for complete search history.

(56) References Cited

U.S. PATENT DOCUMENTS

| 4,812,238 A * | 3/1989 | Cadotte et al. ............ 210/636 |
| 4,888,116 A * | 12/1989 | Cadotte et al. ............ 210/636 |
| 2005/0087070 A1 | 4/2005 | Odaka et al. |

FOREIGN PATENT DOCUMENTS

| JP | 2003-245530 A | 9/2003 |
| JP | 2005-186059 A | 7/2005 |

(Continued)

OTHER PUBLICATIONS

JP 2009-255075 Human Translation, published Nov. 5, 2009.*

(Continued)

Primary Examiner — Bobby Ramdhanie
Assistant Examiner — Benjamin J Behrendt
(74) Attorney, Agent, or Firm — Birch, Stewart, Kolasch & Birch, LLP

(57) ABSTRACT

A composite semipermeable membrane comprising a porous support membrane on which a separating functional polyamide layer resulting from the polycondensation reaction of polyfunctional aromatic amines with polyfunctional acid halides is formed, wherein the separating functional polyamide layer has carboxy groups, amino groups, phenolic hydroxyl groups, and azo groups, wherein $X_A$, the ratio of the amino groups (molar equivalent of the amino groups/(molar equivalent of the azo groups+molar equivalent of the phenolic hydroxyl groups+molar equivalent of the amino groups)) on a feed water contact surface of the separating functional polyamide layer (an A surface), is in the range 0.5 or less, and $X_B$, the ratio of the amino groups (molar equivalent of the amino groups/(molar equivalent of the azo groups+molar equivalent of the phenolic hydroxyl groups+molar equivalent of the amino groups)) on a permeate-side surface of the separating functional polyamide layer (a B surface), i.e., the opposite side to the A surface, is in the range of 0.5 to 1. The present invention provides a composite semipermeable membrane that achieves a balance between high solute removal properties and a high permeate flow rate and has high organic-solvent resistance, and a method for producing same.

16 Claims, 3 Drawing Sheets

(56) References Cited

FOREIGN PATENT DOCUMENTS

| JP | 2007-90192 A | 4/2007 |
|----|--------------|--------|
| JP | 2008-260009 A | 10/2008 |
| JP | 2009-255075 A | 11/2009 |

OTHER PUBLICATIONS

PCT/ISA/210—International Search Report dated Jan. 25, 2011, issued in PCT/JP2010/072626.

* cited by examiner

COMPOSITE SEMIPERMEABLE MEMBRANE AND METHOD FOR PRODUCING SAME

TECHNICAL FIELD

The present invention relates to a composite semipermeable membrane that simultaneously satisfies high water permeation performance and high solute removal performance, and further relates to a composite semipermeable membrane having a chemical structure with high solvent resistance and a method for producing same.

BACKGROUND ART

Regarding separation of a mixture, there are various techniques for removing substances (for example, salts) dissolved in a solvent (for example, water), and membrane separation processes have been used as a process for energy saving and resource saving. Examples of membranes used in membrane separation processes include, for example, a microfiltration membrane, an ultrafiltration membrane, and a reverse osmosis membrane, and in recent years, membranes that fall between the reverse osmosis membrane and the ultrafiltration membrane (loose RO membrane or NF membrane: nanofiltration membrane) have been developed and used. These membranes allow obtaining drinking water, for example, from sea water, brackish water, and water containing harmful substances, and, in addition, have been used, for example, in the production of industrial ultrapure water, wastewater treatment, and recovery of valuables.

Most of the composite semipermeable membranes that are commercially available at present fall within two types: one having on a porous support membrane a gel layer and an active layer in which polymers are cross-linked; and the other having on a porous support membrane an active layer produced by polycondensation of monomers. Above all, a composite semipermeable membrane obtained by coating a porous support membrane with an ultrathin membrane layer composed of cross-linked polyamide obtained by polycondensation reaction of polyfunctional amines with polyfunctional acid halides has been widely used as a reverse osmosis membrane having high permeability and selective separation properties.

However, it is known that a long-time contact of a reverse osmosis membrane with an oxidizing agent such as hydrogen peroxide, hypochlorous acid, or ozone, which is added for decomposition and removal of a solute, sterilization, or membrane washing, or with organic matter such as ethanol and isopropyl alcohol, degrades the membrane performance with time, and improvement in durability has been demanded.

PRIOR ART DOCUMENTS

Patent Documents

Patent Document 1 discloses that a reverse osmosis membrane that is provided with a discriminating layer induced from a polymer having on average at least one primary amino group or a salt thereof and at least one group reactive with a diazonium salt by reacting a primary amino group or a salt thereof with a group having reactivity with a precursor of a diazonium salt or with a diazonium salt, thereby having high solute removal properties and high water permeability, can be obtained.

Patent Document 2 discloses a modified semipermeable membrane characterized in that the optical transmittance of a polyamide composite semipermeable membrane at a wavelength of 450 nm is in the range of 10 to 95% and that it has phenolic hydroxyl groups.

Patent Document 3 discloses a composite semipermeable membrane characterized in that it is obtained by forming on a porous support membrane a separating functional polyamide layer composed of polyfunctional amine compounds and polyfunctional acid halides and that the polyamide and iodine are bonded.

Patent Document 1: JP 63-175604 A
Patent Document 2: JP 2005-177741 A
Patent Document 3: JP 2006-21094 A

SUMMARY OF THE INVENTION

Problems to be Solved by the Invention

However, the membranes of Patent Documents 1 and 2 had a problem of having a low neutral molecule removal rate while achieving a high ion removal rate and a permeate flow rate.

The membrane of Patent Document 3 had a problem of having a low permeate flow rate while simultaneously satisfying a high ion removal rate and neutral molecule removal rate.

As described above, in composite semipermeable membranes, there is still a need for more stable operation and easy operability in various water treatments, a viewpoint of pursuing low cost by means of, for example, reducing membrane replacement frequency, and membrane performance stability sufficient to withstand washing and sterilization with various oxidizing agents and organic matter, especially with hypochlorous acid and alcohol.

An object of the present invention is to provide a composite semipermeable membrane that simultaneously satisfies high water permeation performance and high solute removal performance and further has a chemical structure with high solvent resistance.

Means for Solving the Problems

To solve such problems, the composite semipermeable membrane of the present invention has the following constitution, that is, a composite semipermeable membrane comprising a porous support membrane on which a separating functional polyamide layer resulting from the polycondensation reaction of polyfunctional aromatic amines with polyfunctional acid halides is formed, wherein the separating functional polyamide layer has carboxy groups, amino groups, phenolic hydroxyl groups, and azo groups, wherein $X_A$, the ratio of the amino groups (molar equivalent of the amino groups/(molar equivalent of the azo groups+molar equivalent of the phenolic hydroxyl groups+molar equivalent of the amino groups)) on a feed water contact surface of the separating functional polyamide layer (an A surface), is in the range 0.5 or less, and $X_B$, the ratio of the amino groups (molar equivalent of the amino groups/(molar equivalent of the azo groups+molar equivalent of the phenolic hydroxyl groups+molar equivalent of the amino groups)) on a permeate-side surface of the separating functional polyamide layer (a B surface), i.e., the opposite side to the A surface, is in the range of 0.5 to 1.

The method of producing the composite semipermeable membrane of the present invention has the following constitution, that is, the method of producing a composite semipermeable membrane comprising a porous support membrane on which a separating functional polyamide layer resulting from the polycondensation reaction of polyfunctional amines with polyfunctional acid halides is formed, the method involving a modification process A in which a solution containing a compound that reacts with primary aromatic amino groups in the above-described separating functional polyamide layer and forms a diazonium salt or derivatives thereof is contacted only with a feed water contact surface (front surface) of the separating functional polyamide layer.

In the composite semipermeable membrane of the present invention, it is preferred that $Y_A$, the ratio of the azo groups (molar equivalent of the azo groups/(molar equivalent of the phenolic hydroxyl groups+molar equivalent of the azo groups)) on the above-described A surface, be larger than $Y_B$, the ratio of the azo groups (molar equivalent of the azo groups/(molar equivalent of the phenolic hydroxyl groups+molar equivalent of the azo groups)) on the above-described B surface, that is, $Y_A>Y_B$.

The composite semipermeable membrane of the present invention is preferably a composite semipermeable membrane having a porous support membrane wherein a porous support layer is formed on the front-side surface of a porous support having a coarse back side and wherein the porous support layer extends into the above-described porous support, wherein the porous support is a woven fabric, nonwoven fabric, or net, the density on the back side of the woven fabric, nonwoven fabric, or net being lower than the density on the front side, and wherein the porous support layer extends to the region from the back-side surface of the porous support to 50% of the total thickness.

The method of producing the composite semipermeable membrane of the present invention preferably involves a modification process B in which a solution containing a compound having reactivity with a diazonium salt or derivatives thereof is contacted with the composite semipermeable membrane subsequently to the modification process A or simultaneously with the modification process A.

Effects of the Invention

According to the present invention, a composite semipermeable membrane that simultaneously satisfies high water permeation performance and high solute removal performance and further has a chemical structure with high solvent resistance can be provided.

BEST MODE FOR CARRYING OUT THE INVENTION

Figure 1:
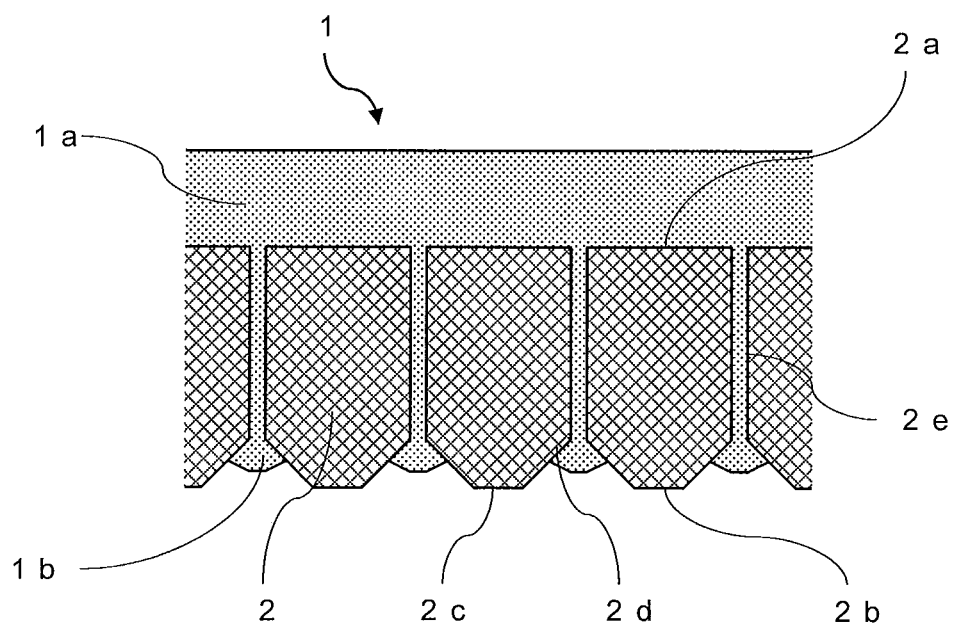
FIG. 1 is a schematic cross-sectional view of the porous support membrane showing one embodiment of the present invention.

In one aspect of the composite semipermeable membrane of the present invention, a porous support membrane that substantially does not have separation performance is coated with a separating functional layer that substantially has separation performance, wherein the separating functional layer is composed of cross-linked polyamide obtained by reaction of polyfunctional aromatic amines with polyfunctional acid halides.

A polyfunctional aromatic amine refers to an aromatic amine having two or more amino groups in one molecule, examples of which include, but are not limited to, m-phenylenediamine, p-phenylenediamine, 1,3,5-triaminobenzene, and the like. Examples of N-alkylates thereof include, for example, N,N-dimethyl m-phenylenediamine, N,N-diethyl m-phenylenediamine, N,N-dimethyl p-phenylenediamine, and N,N-diethyl p-phenylenediamine, and, in particular, m-phenylenediamine and 1,3,5-triaminobenzene can be preferably used in the present invention in terms of stability in performance exhibition.

Further, the polyfunctional aromatic amine in the present invention may be used in combination with an aliphatic polyfunctional amine.

An aliphatic polyfunctional amine refers to an aliphatic amine having two or more amino groups in one molecule, preferably a piperazine-based amine and derivatives thereof. Example thereof include, for example, piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, and 2,5-di-n-butylpiperazine, and, in particular, piperazine and 2,5-dimethylpiperazine can be preferably used in the present invention in terms of stability in performance exhibition.

Further, the polyfunctional aromatic amine in the present invention may be used in combination with an aromatic amine compound having phenolic hydroxyl groups and/or azo groups. Preferred examples of aromatic amine compounds include amidol, 3,3'-dihydroxybenzidine, 3-amino-L-tyrosine, 3-amino-4-hydroxybenzhydrazide, 3-hydroxy-DL-kynurenine, 2,5-diaminohydroquinone, 1,5-diamino-4,8-dihydroxyanthraquinone, 4,6-diaminoresorcinol, Bismarck brown Y, Bismarck brown R, 4,4'-azodianiline, 2,4-diaminoazobenzene, p-ethoxychrysoidine, chrysoidine R, Disperse Diazo Black 3BF, Methoxy Red, 4-(5-chloro-2-pyridylazo)-1,3-phenylenediamine, 4-(3,5-dibromo-2-pyridylazo)-1,3-phenylenediamine, and salts thereof.

Further, other preferred examples of aromatic amine compounds include 4-amino-2-nitrophenol, picramic acid, 2-aminophenol, 3-aminophenol, 4-aminophenol, 2-amino-4-chlorophenol, 4-sodium aminosalicylate, 2-amino-5-nitrophenol, 2-amino-4-nitrophenol, 1-amino-2-naphthol-4-sulfonic acid, 3-hydroxyanthranilic acid, 2-amino-p-cresol, 2-hydroxy-4-methoxyaniline, 3-amino-2-naphthol, 4-aminosalicylic acid, 5-amino-o-cresol, 5-aminosalicylic acid, 2-amino-8-naphthol-6-sulfonic acid, 2-amino-5-naphthol-7-sulfonic acid, 2-methyl-4-amino-1-naphthol, 2-amino-4-chloro-5-nitrophenol, 2-amino-4-chlorophenol-6-sulfonic acid, 3-amino-4-hydroxy-5-nitrobenzenesulfonic acid, p-phenylazoaniline, 2-aminoazotoluene, 4-aminoazobenzene, Oil Yellow AB, Disperse Orange 3, 4-(4'-aminophenylazo)phenylarsonic acid, Mordant Yellow 12, 4-amino-4'-dimethylaminoazobenzene, α-naphthyl red, 4-phenylazo-4-naphthylamine, 4-aminobenzene-4'-sodium sulfonate, and salts thereof.

According to "Fundamentals of Synthetic Membrane" by Takeshi Matsuura (Kitami Shobo Co.), p. 9, in performance exhibition of a reverse osmosis membrane, a membrane most appropriate for a given application can be designed by selecting, for example, the type, the amount, and the position of ionic groups (functional groups). The present inventors have discovered that, for improving the performance of a cross-linked polyamide membrane, it is effective to make a phenolic hydroxyl group, which is a hydrophilic group, exist in addition to carboxy groups and amino groups constituting the main chain. Further, the present inventors also discovered that, as a means of improving the durability of polyamide, it is effective to make an azo group, which has a high robustness-improving effect, coexist by applying a technique for developing a pigment (dye).

A polyfunctional acid halide refers to an acid halide having two or more halogenated carbonyl groups in one molecule and is not particularly restricted as long as it reacts with the above-described amine to give polyamide. As a polyfunctional acid halide, for example, an acid halide of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, or 1,4-benzenedicarboxylic acid can be used. Among acid halides, acid chlorides are preferred, and trimesic acid chloride, which is an acid halide of 1,3,5-benzenetricarboxylic acid, is preferred particularly in terms of economy, availability, handleability, reactivity, and the like. The above-described polyfunctional acid halides can be used alone or may be used in combination.

An organic solvent that dissolves polyfunctional acid halides, preferably, is immiscible with water and does not break a porous support membrane, and may be any solvent as long as it does not inhibit cross-linked polyamide forming reaction. Representative examples include liquid hydrocarbons and halogenated hydrocarbons such as trichlorotrifluoroethane, and in view of being a substance that does not deplete the ozone layer, availability, handleability, and safety in handling, octane, nonane, decane, undecane, dodecane, tridecane, tetradecane, heptadecane, hexadecane, cyclooctane, ethylcyclohexane, 1-octene, 1-decene, and the like, or mixtures thereof are preferably used.

Further, the above-described functional groups can be introduced also by converting amino groups present in the above-described cross-linked polyamide into phenolic hydroxyl groups or azo groups through the chemical reaction appropriately selected. For example, amino groups can be converted into phenolic hydroxyl groups by using as a reagent dinitrogen tetroxide, nitrous acid, nitric acid, sodium bisulfate, sodium hypochlorite, or the like, while amino groups can be converted into azo groups by, for example, azo coupling reaction via diazonium salt formation or reaction of amino groups with a nitroso compound.

The present inventors intensively studied to discover that, for simultaneously satisfying the membrane performance and durability in a composite semipermeable membrane having a separating functional polyamide layer, it is important that functional groups related to improvement of the performance of the separating functional polyamide layer (carboxy groups, amino groups, and phenolic hydroxyl groups) and a functional group related to improvement of the durability (azo groups) both exist and that the distribution be present in the thickness direction of the membrane, and that a composite semipermeable membrane that satisfies high water permeation performance and high solute removal performance in a certain range and at the same time is provided with high durability to an oxidizing agent and an organic solvent can be obtained.

The composite semipermeable membrane of the present invention is provided on its porous support membrane with a separating functional polyamide layer, and this separating functional polyamide layer contains carboxy groups, amino groups, phenolic hydroxyl groups, and azo groups. The presence of carboxy groups, amino groups, and phenolic hydroxyl groups, which are a hydrophilic functional group, in the separating functional polyamide layer increases the water permeability of the membrane and enhances the performance of the composite semipermeable membrane.

On the other hand, the presence of azo groups increases the durability of the composite semipermeable membrane, but the permeate water volume decreases with increasing content. In general, an amino group is readily oxidized with an oxidizing agent such as chlorine or hypochlorous acid. Considering the above, simultaneous achievement of improved durability and high membrane performance was made possible by reducing the amount of amino functional groups and increasing the content ratio of azo groups only on the front side of the composite semipermeable membrane, and preferably by increasing the amount of phenolic hydroxyl groups as well.

The amount of functional groups in the separating functional polyamide layer is analyzed by using, for example, electron spectroscopy for chemical analysis (ESCA). Specifically, it is determined by using the electron spectroscopy for chemical analysis (ESCA) exemplified in "Journal of Polymer Science", Vol. 26, pp. 559-572 (1988) and "Journal of the Adhesion Society of Japan", Vol. 27, No. 4 (1991).

The concentration of amino groups such as primary amines and secondary amines, the concentration of phenolic hydroxyl groups, and the concentration of carboxy groups are determined by gas-phase chemical modification method using a labeling reagent. As a labeling reagent, pentafluorobenzaldehyde is used for primary amines; trifluoroacetic anhydride is used for phenolic hydroxyl groups and amino groups; and trifluoroethanol or dicyclohexylcarbodiimide is used for carboxy groups. Labeling reagents are changed depending on the type of hydrophilic groups to use the same measurement method.

An example of the method of measuring the concentration of carboxy groups based on the total carbon will now be described. A sample is subjected to gas-phase chemical modification using a labeling reagent, and the reaction rate (r) and reaction residue (m) of the labeling reagent are determined from the ESCA spectrum of the polyacrylic acid standard sample subjected to gas-phase chemical modification at the same time. Next, $[F_{1s}]$, the integrated intensity of $F_{1s}$ peak (peak of is orbital of fluorine) resulting from the reaction of the sample with the labeling reagent, is determined. $[C_{1s}]$, the integrated intensity of $C_{1s}$ peak (peak of 1 s orbital of carbon), is determined by elemental analysis.

The measurement conditions are shown below.

Apparatus: SSX-100 (manufactured by SSI, US)

Excitation X-ray: aluminum $K\alpha_1$, $K\alpha_2$ radiation (1486.6 eV)

X-ray output: 10 kV, 20 mV

Photoelectron emission angle: 35°

In data processing, the $C_{1s}$ peak position of neutral carbon (CHx) is set at 284.6 eV.

The integrated intensity $[F_{1s}]$ and $[C_{1s}]$ determined as mentioned above is substituted into the following equation shown in "Journal of Polymer Science", Vol. 26, pp. 559-572 (1988) to determine the concentration of carboxy groups based on the total carbon.

$$R_{COOH} = \frac{[F_{1S}]}{(3k_{F1s}[C1s] - (2+13m)[F1s])r} \quad \text{[Numerical Formula 1]}$$

The distribution of the amount of functional groups in the thickness direction of the separating functional polyamide layer can be determined by taking out only the separating functional polyamide layer from the composite semipermeable membrane to provide an extracting functional layer and separately measuring the ratio of a particular functional group on the front-surface side of the original composite semipermeable membrane (the A surface), the side contacting feed water, and on the surface of the side where the permeate water passes through (the B surface).

X, the ratio of the amino groups in the extracting functional layer, (molar equivalent of the amino groups/(molar equivalent of the azo groups+molar equivalent of the phenolic hydroxyl groups+molar equivalent of the amino groups)) is related to the durability of the composite separation membrane. When the value is low, the robustness of the membrane increases to improve the durability, but the water permeability tends to decrease. Therefore, in the composite semipermeable membrane of the present invention, it is necessary that the above-described $X_A$, the ratio of the amino groups on the A surface, be in the range 0.5 or less and that the above-described $X_B$, the ratio of the amino groups on the B surface, be in the range of 0.5 to 1.

Further, Y, the ratio of the azo groups in the extracting functional layer, (molar equivalent of the azo groups/(molar equivalent of the phenolic hydroxyl groups+molar equivalent of the azo groups)) is related to the water permeability and solute removal performance of the composite semipermeable membrane. When the value is low, the hydrophilicity increases to improve the water permeability, but the solute removal rate tends to decrease. For further enhancing the improvement of the durability on the surface contacting treatment water, an oxidizing agent, and organic matter, $Y_A$, the ratio of the azo groups (molar equivalent of the azo groups/(molar equivalent of the phenolic hydroxyl groups+molar equivalent of the azo groups)) on the A surface, is preferably larger than $Y_B$, the ratio of the azo groups (molar equivalent of the azo groups/(molar equivalent of the phenolic hydroxyl groups+molar equivalent of the azo groups)) on the B surface.

Each production process will now be described in detail.

The separating functional polyamide layer substantially having separation performance in the composite semipermeable membrane is formed, for example, by using an aqueous solution containing the above-mentioned polyfunctional primary aromatic amines and a water-immiscible organic solvent solution containing the above-mentioned polyfunctional acid halides for reaction on the porous support membrane described below.

The aqueous solution containing polyfunctional primary aromatic amines and the organic solvent solution containing polyfunctional acid halides may contain, as required, compounds such as acylation catalysts and polar solvents, acid trapping reagents, surfactants, and antioxidants as long as the reaction between the two components is not impeded.

In the present invention, the porous support membrane is used to support the separating functional polyamide layer. Although the constitution of the porous support membrane is not particularly restricted, preferred examples of the porous support membrane include, for example, a polysulfone support membrane reinforced with fabric. Although the pore size and the number of pores of the porous support membrane are not particularly restricted, preferred is a support membrane having uniform micropores or micropores gradually increasing in size from one side to the other side and having a structure such that the size of the micropores is not more than 100 nm at the surface of the one side.

The porous support membrane used in the present invention can be selected from various commercially available materials such as "Millipore filter VSWP" available from Millipore and "Ultrafilter UK10" available from Toyo Roshi Kaisha, Ltd. and also can be produced according to the method described in "Office of saline Water Research and Development Progress Report", No. 359 (1968).

Materials used in the porous support membrane is not particularly limited, and, for example, a homopolymer of polysulfone, cellulose acetate, cellulose nitrate, polyvinyl chloride, and the like, or a blend thereof and the like can be used; however, polysulfone, which has high chemical, mechanical, and thermal stability, is preferably used. Specifically, for example, a solution of polysulfone in dimethylformamide (hereinafter referred to as DMF) is applied on a densely-woven polyester fabric or a nonwoven fabric to a substantially uniform thickness and subjected to wet coagulation in an aqueous solution containing 2% by weight of DMF, whereby a preferred porous support membrane having micropores with a diameter of a few tens of nm or less at most of the surface can be obtained.

Further, in the porous support membrane, it is preferred that a porous support layer be formed on a porous support and that the above-described porous support layer extend into the above-described porous support.

Examples of the porous support include, for example, a woven fabric, nonwoven fabric, and net made of polyester, polypropylene, polyethylene, polyamide, or the like, and a nonwoven fabric is suitably used in terms of film-forming properties and cost. A nonwoven fabric can be produced, for example, by filtering out main fibers and binder fibers uniformly dispersed in water with a cylinder paper machine, a fourdrinier paper machine, or the like, and drying the fibers with a dryer. Further, it is also preferable to subject the nonwoven fabric to pressure-heat processing by sandwiching the nonwoven fabric between two rolls for the purpose, for example, of removing fluff or improving mechanical properties.

FIG. 1 schematically illustrates an example of preferred porous support membranes. In a porous support membrane 1, a porous support membrane layer 1*a* is formed on a front-side surface 2*a* of a porous support 2, and the porous support membrane layer 1*a* extends into the porous support 2. Such the porous support membrane 1 is obtained by applying a membrane-forming solution of the porous support layer 1*a* to the front-side surface 2*a* of the porous support 2 and allowing the applied solution to solidify. In this process, the membrane-forming solution permeates into the porous support 2 through holes 2*e* of the porous support 2 and solidifies. Consequently, the porous support layer 1*a* extends into the porous support 2. As the porous support 2, a porous support having a coarse back side is preferably used. In one aspect of the porous support having a coarse back side, as shown in FIG. 1, a large number of recesses 2*d* are formed on a back-side surface 2*b*.

In the aspect shown in FIG. 1, a large number of the recesses 2*d* are dispersedly formed on the back-side surface 2*b* of the porous support 2, and the porous support layer 1*a* extends to the recesses 2*d* at the back-side surface 2*b* of the porous support 2 and is anchored to the recesses 2*d*. The sentence "extends to the recesses at the back-side surface and is anchored to the recesses" means the situation where the membrane-forming solution, although having reached the recesses 2*d*, has not reached a convex surface 2*c*, which is an outermost surface of the back side, and has solidified.

Thus, the membrane-forming solution applied on the front side permeates through the holes 2*e* of the porous support 2 to the recesses 2d at the back-side surface 2b and then solidifies. The membrane-forming solution, as shown in FIG. 1, spreads in the horizontal direction after reaching the recesses 2d, and consequently it can hardly reach the convex surface 2c.

Figure 2:
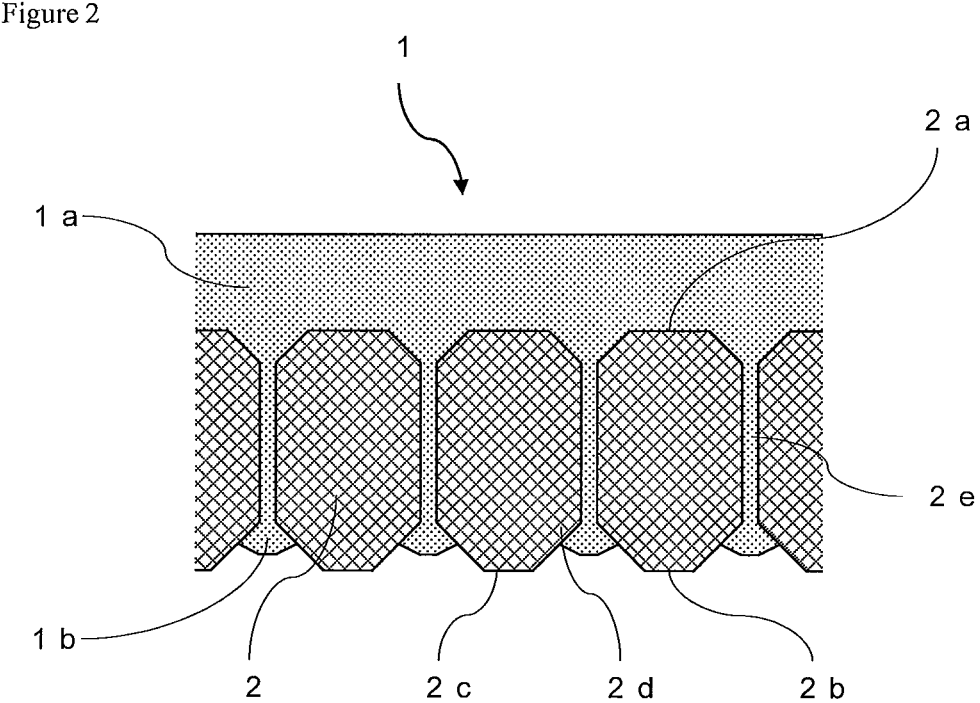
FIG. 2 is a schematic cross-sectional view of the porous support membrane showing another embodiment of the present invention.

In the porous support 2, if the back-side surface is coarse, the recesses 2d may be formed also on the front-side surface 2a as shown schematically in FIG. 2. However, when the recesses are formed on both the front side and the back side, it is likely that the strength of the porous support 2 decreases, and in turn the strength of the separation membrane decreases. Therefore, the front-side surface 2a of the porous support 2 is preferably smooth.

Figure 3:
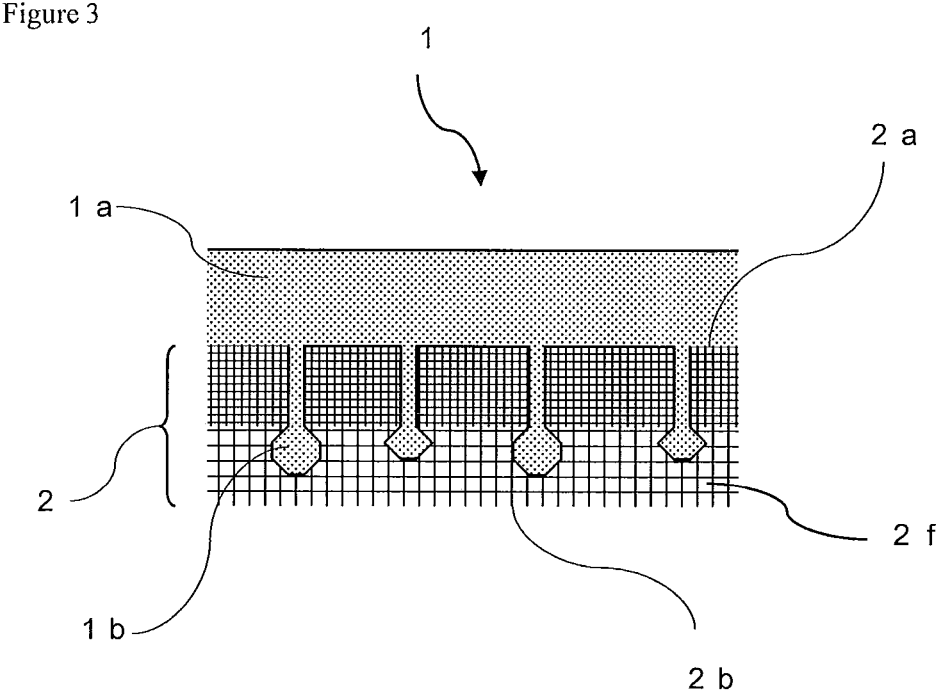
FIG. 3 is a schematic cross-sectional view of the porous support membrane showing another embodiment of the present invention.

Further, in another aspect of the porous support having a coarse back side, as shown schematically in FIG. 3, distinct recesses are not formed on the back-side surface 2b, and the density on the back side is lower than the density on the front side. In such an aspect, the same effect as in the above-described case where the recesses are formed can be obtained.

Thus, the membrane-forming solution applied on the front side of the porous support 2 permeates through the holes 2e to a layer 2f having a low back-side density (hereinafter referred to as a coarse layer) and then solidifies. The membrane-forming solution, as shown in FIG. 3, spreads in the horizontal direction after reaching the coarse layer 2f, and consequently it can hardly reach the back-side surface 2b. Therefore, occurrence of defects on the separation membrane due to the membrane-forming solution that has reached the back-side surface and solidified can be prevented.

Further, the production solution solidified in the coarse layer 2f forms an anchoring portion 1b and anchors to the coarse layer 2f. Consequently, the adhesiveness between the porous support 2 and the porous support layer 1a becomes high. At this time, the contact effect between the membrane and the surface of the above-described solution containing a compound that reacts with primary aromatic amino groups and forms a diazonium salt or derivatives thereof is significantly improved. The reason for this, although not clear, is believed to be due to the change in the state of preservation of various reagents in the functional layer resulting from the change in internal diffusion behavior from the surface.

The average density in the region from the back-side surface of the porous support to 50% of the total thickness (hereinafter referred to as the back-side region) is preferably in the range of 5 to 90% of the average density in the region from the front-side surface of the porous support to 50% of the total thickness (hereinafter referred to as the front-side region). When the average density in the back-side region is not more than 90% of the average density in the front-side region, occurrence of defects on the separation membrane due to the membrane-forming solution that has reached the back-side surface and solidified can be prevented. The average density in the back-side region is more preferably not more than 80%, and still more preferably not more than 70% of the average density in the front-side region. When the average density in the back-side region is not less than 5% of the average density in the front-side region, the strength of the separation membrane is high. The average density in the back-side region is more preferably not less than 15%, and still more preferably not less than 30% of the average density in the front-side region.

Average density herein refers to the percentage of a cross-sectional area of the porous support in a measurement region obtained by taking an enlarged photograph of a cross section taken perpendicular to the surface of the porous support by using a light microscope or the like, that is, the value obtained by dividing the cross-sectional area of the porous support by the area of the measurement region.

In the composite semipermeable membrane of the present invention, the porous support layer preferably extends to the region from the back-side surface of the porous support to 50% of the total thickness, that is, the back-side region. The sentence "extends to the back-side region" means the situation where the membrane-forming solution, although having reached the back-side region, has not reached the back-side surface 2b and has solidified. When the porous support layer extends to the back-side region of the porous support, the adhesiveness between the porous support 2 and the porous support layer 1a becomes high, and besides the contact effect between the membrane and the surface of the above-described solution containing a compound that reacts with primary aromatic amino groups and forms a diazonium salt or derivatives thereof is significantly improved.

As a porous support of the present invention, those having a coarse back side are used. The method of producing such a porous support is preferably, but not limited to, a method in which a porous support is subjected to pressure-heat processing. When using a nonwoven fabric, it is preferable in terms of productivity and cost to coarsely process the back side by pressure-heat processing during the production of the nonwoven fabric.

Examples of the pressure-heat processing include embossing and calendering. When calendering is used, the smoothness of the porous support can be controlled by adjusting the surface temperature of two rolls that sandwich the porous support, the clamping force of these rolls, and the transfer rate of the porous support, that is, the pressing time. The higher the surface temperature of the rolls and the longer the contact time with the rolls, the smoother the surface of the porous support. By contrast, the lower the surface temperature of the rolls and the shorter the contact time with the rolls, the coarser the surface of the porous support. In other words, a porous support that is preferred for the composite semipermeable membrane of the present invention can be obtained by setting the temperature of the roll that contacts the back-side surface of the porous support at lower than the temperature of the roll that contacts the front-side surface or setting the contact time of the roll with the back-side surface of the porous support at shorter than the contact time with the front-side surface. When embossing is used, a porous support that is preferred for the composite semipermeable membrane of the present invention can be obtained by contacting rolls provided on their surface with irregularities with the back-side surface of the porous support.

In the composite semipermeable membrane of the present invention, the thickness of the porous support is preferably in the range of 40 μm to 150 μm, and more preferably 40 μm to 80 μm. When the thickness of the porous support is in this range, the strength of the separation membrane is high, and besides thinning of membranes can be achieved. The thickness of the porous support is more preferably in the range of 40 μm to 80 μm.

The back-side surface of the porous support preferably has a smoothness, measured according to JIS P 8119, in the range of 1 to 20 s. In order for the membrane-forming solution not to reach the convex surface 2c and to reliably solidify in the recesses 2d by increasing the depth of the recesses on the porous support back-side surface, the smoothness is preferably not more than 20 s, more preferably not more than 15 s, and most preferably not more than 10 s. On the other hand, in order not to increase the membrane thickness and to eliminate the possibility that when separation membranes are laminated, for example, during winding, the irregularities on the porous support back-side surface damage the membrane surface of the adjacent separation membrane, the smoothness is preferably not less than 1 s, more preferably not less than 3 s, and most preferably not less than 5 s.

In coating the porous support membrane surface with an aqueous solution containing polyfunctional primary aromatic amines, the surface is preferably coated with the aqueous solution uniformly and continuously, and coating may be carried out by known means for coating, for example, coating of the porous support membrane surface with the aqueous solution, immersion of the porous support membrane in the aqueous solution, and the like. It is preferable, then, to remove the excessively applied aqueous solution by a draining process. Examples of methods of draining the solution include, for example, holding the membrane surface vertically for gravity flow, and the like. After the draining, the membrane surface may be dried to remove all or a portion of the water of the aqueous solution. Thereafter, the above-mentioned organic solvent solution containing polyfunctional acid halides is applied to the porous support membrane coated with the aqueous solution containing polyfunctional primary aromatic amines to cause a reaction for forming a separating functional layer of cross-linked polyamide.

The concentration the aqueous solution containing polyfunctional primary aromatic amines is preferably 0.1 to 20% by weight, and more preferably 0.5 to 15% by weight.

Although the concentration of polyfunctional acid halides is not particularly restricted, from the standpoint of achieving sufficient formation of a separating functional layer that serves as an active layer to thereby be free of defects and, at the same time, avoiding excessive concentration to thereby be advantageous also in terms of cost, preferred is about 0.01 to 1.0% by weight in an organic solvent solution. The removal of the organic solvent after the reaction can be carried out, for example, by the method described in JP 05-76740 A, and the like. Further, it is more preferable to contact the separating functional layer after the removal the organic solvent described above with a solution containing polyfunctional amines.

Although the composite semipermeable membrane thus obtained may be subjected as obtained to the subsequent treatment process, it is preferable to remove unreacted residue before the subjection, for example, by washing with water. It is preferable to remove remaining amino compounds and the like by washing the membrane with water within the range of 30 to 100° C. The washing can be performed by immersing the membrane in the water within the above-described temperature range or spraying water. When the temperature of the water used is in the above-described preferred range, the permeate flow rate can be maintained high because amino compounds do not remain in the composite semipermeable membrane, and the permeate flow rate will not be low because heat shrink of the membrane will not occur. Further, it is preferable to thereafter perform various post-treatments as required.

Then, by the modification process A, in which the composite semipermeable membrane produced by the above-mentioned method (the process of forming on a porous support membrane a separating functional polyamide layer resulting from the polycondensation reaction of polyfunctional primary aromatic amines with polyfunctional acid halides) is then contacted with a solution containing a compound that reacts with primary amino groups in the separating functional polyamide layer and forms a diazonium salt or derivatives thereof, a diazonium salt or derivatives thereof are formed. In this process, when the composite semipermeable membrane is brought into contact with the solution containing a compound that forms a diazonium salt or derivatives thereof, it is necessary to contact the compound solution only with the front surface of the separating functional polyamide layer (the A surface). For example, applying or spraying the compound solution onto the surface under static pressure, and immersing the whole composite semipermeable membrane in the compound solution after a block processing for avoiding infiltration of the chemical solution to the back surface (the B surface) side may be used, and the method is not limited as long as the compound solution contacts only the front surface of the separating functional layer.

Examples of the compound used in the modification process A of the present invention that reacts with primary amino groups and forms a diazonium salt or derivatives thereof include, for example, nitrous acid and a salt thereof, and a nitrosyl compound, and the solution used in the present invention is preferably an aqueous solution thereof. Since the aqueous solution of nitrous acid and a nitrosyl compound readily generate gas and decompose, it is preferable to sequentially generate nitrous acid by the reaction, for example, of nitrite with an acidic solution. In general, nitrite generates nitrous acid ($HNO_2$) by reacting with hydrogen ions, and the generation is efficient at 20° C. and when the pH of an aqueous solution is 7 or lower, preferably 5 or lower, and more preferably 4 or lower. Above all, an aqueous solution of sodium nitrite obtained by the reaction with hydrochloric acid or sulfuric acid in an aqueous solution is particularly preferred in terms of convenience in handling.

In the modification process A of the present invention, the concentration of nitrous acid or nitrite in the above-described compound solution that reacts with primary amino groups and forms a diazonium salt or derivatives thereof is preferably in the range of 0.01 to 1% by weight at 20° C. Within this preferred range, a sufficient reaction effect can be obtained, and at the same time it will not be difficult to handle the solution because the concentration is not too high.

The temperature of the nitrous acid solution is preferably 15° C. to 45° C. Within this temperature range, the reaction will not take too much time, and at the same time the handling will not be difficult because the temperature is not too high to accelerate the decomposition of nitrous acid.

The contact time with the nitrous acid solution is preferably the time during which a diazonium salt is generated; the treatment can be carried out in a short time at a high concentration, but it requires a long time at a low concentration. A short time treatment at a high concentration is desirable from the standpoint of preventing the diazonium salt from reacting with water before reaction with a compound reactive with the diazonium salt. For example, in the case of a nitrous acid solution of 2000 mg/L, 30 seconds to 10 minutes is preferred.

Further, in the present invention, in addition to subjecting the composite semipermeable membrane to the above-described modification process A, subjecting, subsequently or simultaneously, to the modification process B in which the composite semipermeable membrane is contacted with a solution containing a reagent having reactivity with a diazonium salt, such as an aromatic compound having polyfunctional phenolic hydroxyl groups or an aromatic amine, allows improving ion removal properties and neutral molecule removal properties, which is preferred. This is considered to be an effect of the reaction of the diazonium salt formed in the modification process A with the reagent involved in the modification process B such as an aromatic compound having polyfunctional phenolic hydroxyl groups or amino groups.

Further, in the present invention, the desired effect can be obtained also by performing the above-described modification process B in advance to hold by adsorption an aromatic compound having polyfunctional phenolic hydroxyl groups or amino groups onto a composite semipermeable membrane, and then performing the modification process A to react the diazonium salt formed with the adsorbing reagent having reactivity with the diazonium salt, such as an aromatic compound having polyfunctional phenolic hydroxyl groups or an aromatic amine.

The present inventors intensively studied to discover that, by an aromatic compound having two or more phenolic hydroxyl groups, preferably three or more polyfunctional phenolic hydroxyl groups, or a polyfunctional aromatic amine, a composite semipermeable membrane having a constant permeate flow rate due to the hydration properties of polyfunctional phenolic hydroxyl groups or polyfunctional amino groups and a balance between high ion removal properties and high neutral molecule removal properties can be obtained.

Examples of the compound used in the present invention include compounds having polyfunctional phenolic hydroxyl groups, such as resorcinol, hydroquinone, pyrogallol, 5-methylpyrogallol, phloroglucinol, 2-methylphloroglucinol, 2,4-dimethylphloroglucinol, gallic acid, methyl gallate, ethyl gallate, propyl gallate, isopropyl gallate, butyl gallate, isobutyl gallate, amyl gallate, isoamyl gallate, 2,3,4-trihydroxybenzophenone, 2,3,4-trihydroxyacetophenone, 2,3,4-trihydroxybenzaldehyde, 3,4,5-trihydroxybenzaldehyde, 2,4,6-trihydroxybenzaldehyde, 3,4,5-trihydroxy benzoamide, 2,3,4-trihydroxy benzoic acid, 2,4,6-trihydroxy benzoic acid, 1,2,4-trihydroxybenzene, 5-chloro-1,2,4-trihydroxybenzene, trihydroxybutyrophenone, 2,3,5-trihydroxytoluene, 2,4,6-trihydroxytoluene, flopropione, methyl 2,4,6-trihydroxybenzoate, 2,4-diacetylphloroglucinol, 6-chlorohydroxyquinol, 6-bromohydroxyquinol, purpurogallin, 1,2,3,5-tetrahydroxybenzophenone, naphthalenetriol, 1,2,5,8-naphthalenetetrol, 1,3,8-trihydroxynaphthalene, 1,3,6,8-tetrahydroxynaphthalene, 1,2,3-anthracenetriol, naringenin, naringenin chalcone, quercetin, pelargonidin, cyanidin, luteolin, delphinidin, aurantinidin, malvidin, peonidin, rutin, chlorogenic acid, petunidin, europinidin, rosinidin, catechin, epicatechin, epigallocatechin, epicatechin gallate, and epigallocatechin gallate; and aromatic amines such as o-phenylenediamine, m-phenylenediamine, p-phenylenediamine, 1,3,5-triaminobenzene, or N-alkylates thereof, sulfanyl acid, amidol, 3,3'-dihydroxybenzidine, 3-amino-L-tyrosine, 3-amino-4-hydroxybenzhydrazide, 3-hydroxy-DL-kynurenine, 2,5-diaminohydroquinone, 1,5-diamino-4,8-dihydroxyanthraquinone, 4,6-diaminoresorcinol, Bismarck brown Y, Bismarck brown R, 4,4'-azodianiline, 2,4-diaminoazobenzene, p-ethoxychrysoidine, chrysoidine R, Disperse Diazo Black 3BF, Methoxy Red, 4-(5-chloro-2-pyridylazo)-1,3-phenylenediamine, 4-(3,5-dibromo-2-pyridylazo)-1,3-phenylenediamine, 4-amino-2-nitrophenol, picramic acid, 2-aminophenol, 3-aminophenol, 4-aminophenol, 2-amino-4-chlorophenol, 4-sodium aminosalicylate, 2-amino-5-nitrophenol, 2-amino-4-nitrophenol, 1-amino-2-naphthol-4-sulfonic acid, 3-hydroxyanthranilic acid, 2-amino-p-cresol, 2-hydroxy-4-methoxyaniline, 3-amino-2-naphthol, 4-aminosalicylic acid, 5-amino-o-cresol, 5-aminosalicylic acid, 2-amino-8-naphthol-6-sulfonic acid, 2-amino-5-naphthol-7-sulfonic acid, 2-methyl-4-amino-1-naphthol, 2-amino-4-chloro-5-nitrophenol, 2-amino-4-chlorophenol-6-sulfonic acid, 3-amino-4-hydroxy-5-nitrobenzenesulfonic acid, p-phenylazoaniline, 2-aminoazotoluene, 4-aminoazobenzene, Oil Yellow AB, Disperse Orange 3, 4-(4'-aminophenylazo)phenylarsonic acid, Mordant Yellow 12, 4-amino-4'-dimethylaminoazobenzene, α-naphthyl red, 4-phenylazo-4-naphthylamine, sodium 4-aminobenzene-4'-sulfonate, and salts thereof Further, adding sulfite that serves as a reagent reactive with a diazonium salt improves the reactivity of the reagent.

Among these, in terms of solubility in water and reactivity, resorcinol, hydroquinone, pyrogallol, phloroglucinol, gallic acid, methyl gallate, ethyl gallate, 2,3,4-trihydroxy benzoic acid, 2,4,6-trihydroxy benzoic acid, 1,2,4-trihydroxybenzene, further, flavonoids such as naringenin, quercetin, cyanidin, luteolin, rutin, chlorogenic acid, catechin, epicatechin, epigallocatechin, epicatechin gallate, and epigallocatechin gallate, o-phenylenediamine, m-phenylenediamine, p-phenylenediamine, 1,3,5-triaminobenzene, amidol, 4,6-diaminoresorcinol, Bismarck brown Y, Bismarck brown R, picramic acid, 2-aminophenol, 3-aminophenol, 4-aminophenol, 4-sodium aminosalicylate, and derivatives thereof are preferred. Above all, m-phenylenediamine, 1,3,5-triaminobenzene, and phloroglucinol are particularly preferred in terms of the stability in performance exhibition.

Further, at least a portion of polyfunctional aromatic amines present as an unreacted residue can also be used complementarily as a reagent used in the above-described modification process B. For example, when m-phenylenediamine is used as a polyfunctional aromatic amine, the residual amount in the membrane is in the range of 0 to 1000 mg/m$^2$, and it is preferable to adjust the residual amount as appropriate for subjection to the above-described modification process B. The residual amount can be quantitatively determined by cutting the membrane into 10×10 cm, immersing it in 50 g of ethanol for 8 hours, and performing the instrumental analysis (known various chromatographies, mass spectrometry, and/or electronic absorption spectral analysis) of the components extracted with ethanol.

In general, a diazonium salt and a compound having phenol hydroxyl groups react efficiently under neutral to alkaline conditions. In the present invention, it is preferable to carry out the reaction under conditions of pH 7 or more, and further, it is preferable to carry out the reaction in an aqueous solution in order to obtain a stable performance exhibition effect.

In the modification process B in the present invention, the method of contacting a solution of the above-described compound in the composite semipermeable membrane is not particularly limited. For example, immersion of the whole composite semipermeable membrane in the solution of the compound or spraying of the solution of the compound may be used, and the method is not limited as long as the diazonium salt in the composite semipermeable membrane and the compound are brought into contact. For suppressing the excessive progress of the reaction and obtaining a composite semipermeable membrane with higher water permeation performance, it is preferable to contact the solution of the compound only from the front surface of the composite semipermeable membrane.

The concentration the above-described aqueous solution is preferably not less than 0.01% by weight, and the temperature is preferably not less than 15° C. In cases where the concentration and temperature are less than these values, a sufficient effect cannot be obtained. Further, the contact with the above-described aqueous solution for 30 seconds or more is preferred for obtaining a sufficient reaction effect.

The composite semipermeable membrane of the present invention can be used, for example, to remove harmful substances such as inorganic matter and organic matter and precursor substances thereof contained in feed water at an operating pressure of 0.1 to 10 MPa.

In the present invention, the form of the composite semipermeable membrane is not limited, and it may be a hollow fiber membrane or a flat membrane. Further, the modified composite semipermeable membrane obtained by the present invention forms an element and a module when used for liquid separation, and the form may be, for example, but not limited to, modular or spiral.

EXAMPLES

The present invention will now be described in more detail by way of examples, but the present invention is not limited to these examples. Each evaluation data of the membrane was determined from the following equation by measuring the salt concentration of permeate water when the sea water adjusted to a temperature of 25° C. and a pH of 6.5 (Total Dissolved Solids (TDS) concentration; about 3.5%, boron concentration; about 5.0 ppm) was fed at an operating pressure of 5.5 MPa.

Salt removal rate (%)={1−(salt concentration in permeate water)/(salt concentration in feed water)}×100

The volume of permeated water was determined as a permeate flow rate of water that permeated a membrane in a unit time (day) per unit area ($m^2$) ($m^3/m^2$/day).

Boron removal rate was determined from the following equation by analyzing the boron concentration in feed water and permeate water using an ICP emission spectrometer.

Boron removal rate (%)={1−(boron concentration in permeate water)/(boron concentration in feed water)}×100

In the Examples, to carry out relative evaluation of the performances of these membranes, the permeate flow ratio and the removal rate ratio relative to the membrane performances of Reference Example for comparison were used to carry out performance comparison. Specifically, the permeate flow ratio and the removal rate ratio were determined by the following equation.

Permeate flow ratio=permeate flow rate in each Example and each Comparative Example/permeate flow rate in Reference Example Removal rate ratio=(100−removal rate in each Example and each Comparative Example)/(100−removal rate in Reference Example)

The permeate flow ratio is a change, expressed as a ratio, in permeate flow rate when an untreated composite semipermeable membrane is subjected to various treatments, and when the permeate flow ratio is 1 or more, it means that the permeate flow rate has been increased. The removal rate ratio is a change, expressed as a ratio, in removal rate when an untreated composite semipermeable membrane is subjected to various treatments, and when the removal rate ratio is 1 or less, it means that the removal rate has been increased.

The amount of functional groups in the separating functional polyamide layer was quantitatively determined by using the electron spectroscopy for chemical analysis (ESCA). The concentration of amino groups such as primary amines and secondary amines, the concentration of phenolic hydroxyl groups, and the concentration of carboxy groups were determined by gas-phase chemical modification method using a labeling reagent. As a labeling reagent, pentafluorobenzaldehyde was used for primary amines, and trifluoroacetic anhydride was used for phenolic hydroxyl groups and amino groups.

For the measurement of the distribution of the amount of functional groups in the thickness direction of the separating functional polyamide layer, only the separating functional polyamide layer was taken out from the composite semipermeable membrane to provide an extracting functional layer, and the ratio of a particular functional group on the front-surface side of the original composite semipermeable membrane (the A surface) and on the opposite side (the B surface) were separately measured by ESCA to make a determination.

The amount of m-phenylenediamine in the membrane was determined by cutting the membrane into 10×10 cm, immersing it in 50 g of ethanol for 8 hours, and performing photometric titration of the components extracted with ethanol (288 nm).

The thickness of the porous support was measured according to JIS P 8118 as described below. A micrometer having two parallel circular pressing surfaces was used, the pressing surfaces being composed of a fixed pressing surface with a diameter of 16.0 mm or more and a movable pressing surface with a diameter of 16.0 mm that moves vertically. The micrometer was placed on a vibration-proofing horizontal plane, and a measurement sample was placed between the pressing surfaces of the micrometer. The movable pressing surface was operated at a rate of 3 mm/sec or lower, and the pressure between the pressing surfaces was 100 kPa. Upon confirming that the measurement sample was held between the pressing surfaces, the value was read out immediately after stabilization. Measurements were made at 20 points, and the mean value was taken as the thickness.

The average density in the porous support was measured as described below. The porous support was cut perpendicular to the surface, and a photograph of the cross section was taken with a light microscope at a magnification of ×700. From the photograph taken, an image of the porous support was transferred to a sheet of plain paper by tracing. In the image, the front-side surface and the back-side surface of the porous support were sandwiched between two parallel straight lines. The two parallel lines indicating the front-side surface and the back-side surface were drawn so as to contact the most projecting portion of the front-side surface and the back-side surface, respectively. Next, two parallel lines were drawn perpendicular to the two parallel lines indicating the front-side surface and the back-side surface and in such a manner that the space therebetween was three times the space between the two parallel lines indicating the front-side surface and the back-side surface. The rectangular region enclosed by these four straight lines was taken as the measurement region. The space between the parallel lines indicating the front-side surface and the back-side surface was taken as the total thickness of the porous support. Then, right in the middle of the above-described two parallel lines indicating the front-side surface and the back-side surface, a straight line parallel to the surfaces, that is, the center line was drawn. In the measurement region, the region from the front-side surface to the center line was defined as "the region from the front-side surface to 50% of the total thickness", that is, "the front-side region". The region from the back-side surface to the center line was defined as "the region from the back-side surface to 50% of the total thickness", that is, "the back-side region". In the front-side region, the percentage obtained by dividing the percentage of the cross-sectional area of the porous support in the region by the whole area of the region was taken as the average density in the front-side region. Similarly, in the back-side region, the percentage obtained by dividing the percentage of the cross-sectional area of the porous support in the region by the whole area of the region was taken as the average density in the back-side region.

The smoothness of the porous support was measured according to JIS P 8119 as described below. A test piece of the porous support was placed on an optically flat-finished ring-shaped glass surface with an outer diameter of 37.4 mm±0.05 mm and an effective flat area of 10 cm²±0.05 cm², the glass surface having a circular hole connected to a vacuum chamber at its center. On the test piece, placed were a circular rubber presser plate with a diameter of 45 mm or more, a thickness of 4 mm±0.2 mm, a maximum thickness change of ±0.05 mm, a hardness according to ISO 48 of 40 IRHD±5 IRHD, and a rebound resilience according to ISO 4662 of 62% or more, and a metal pressure plate having a circular flat surface with a diameter of 45 mm or more and being connected to a pressure device, and a pressure of 100 kPa was applied to the pressure plate by using the pressure device to press the test piece against the glass surface. When the above-described vacuum chamber was left to stand after the pressure therein was reduced to lower than 50.7 kPa, air is drawn through the contact surface of the glass surface and the test piece, whereby the pressure in the vacuum chamber gradually increases. The time until the pressure in the vacuum chamber changed from 50.7 kPa to 48.0 kPa was measured, and the time was taken as the smoothness.

Reference Example 1

A fabric-reinforced polysulfone support membrane (ultrafiltration membrane) which is a porous support membrane was produced by the following method. Specifically, a wet nonwoven fabric having an air permeability of 0.7 cm³/cm²/sec, an average pore size of 7 μm or less, and a size of 30 cm long and 20 cm wide was fixed onto a glass plate, the wet nonwoven fabric being made of a mixed fiber of polyester fibers with a single yarn fineness of 0.5 decitex and of 1.5 decitex and being a polyester nonwoven fabric (basis weight: 65 g/m², thickness: 72 μm, width: 250 mm, smoothness on the front-side surface: 10 s, and smoothness on the back-side surface: 5 s) controlled, when calendered, such that the average density in the front-side region was 69% and that the average density in the back-side region was 45%, that is, that the average density in the back-side region was 66% of the average density in the front-side region by setting the temperature of the roll at the back side at lower than that of the roll at the front side. Thereupon, a solution (2.5 poise: 20° C.) having a polysulfone concentration of 15% by weight with dimethylformamide (DMF) solvent was cast to a total thickness of 200 μm. The resultant was immediately immersed in water to obtain a porous support membrane of polysulfone (hereinafter referred to as PS support membrane).

Next, this PS support membrane was immersed in a 3.4% by weight aqueous solution of m-phenylenediamine for 2 minutes, and then a decane solution in which trimeric acid chloride was dissolved in an amount of 0.15% by weight was applied thereto at a rate of 160 mL/m². Then, the membrane was made upright to drain and remove the excess solution, and then, in order to evaporate the solvent remained on the membrane surface, air at a temperature of 30° C. was blown thereon for 1 minute in such a manner that the wind speed on the membrane surface was 8 m/sec. The remaining acid halide groups were hydrolyzed with a 1% aqueous Na₂CO₃ solution. Thereafter, the membrane was immersed in hot water at 90° C. for 2 minutes to obtain a composite semipermeable membrane. The composite semipermeable membrane obtained had a permeate flow rate of 0.81 m³/m²/day, a salt removal rate of 99.8%, and a boron removal rate of 90.0%.

Reference Example 2

The composite semipermeable membrane obtained in Reference Example 1 was immersed in a 10% aqueous isopropyl alcohol solution for 60 minutes at room temperature to wash off the excess reaction residue. The amount of m-phenylenediamine in the composite semipermeable membrane obtained was 4.8 mg/m².

Reference Example 3

A composite semipermeable membrane was obtained in the same manner as in Reference Example 1 except using a wet nonwoven fabric having an air permeability of 0.7 cm³/cm²/sec, an average pore size of 7 μm or less, and a size of 30 cm long and 20 cm wide, the wet nonwoven fabric being a polyester nonwoven fabric with a smooth back side (basis weight: 65 g/m², thickness: 72 μm, and width: 250 mm) controlled, when calendered, such that the average density in the front-side region was 45% and that the average density in the back-side region was 69%, that is, that the average density in the back-side region was 152% of the average density in the front-side region by setting the temperature of the roll at the back side at higher than that of the roll at the front side. The composite semipermeable membrane obtained had a permeate flow rate of 0.78 m³/m²/day, a salt removal rate of 99.7%, and a boron removal rate of 88.9%.

Example 1

To the surface of the separating functional polyamide layer of the composite semipermeable membrane obtained in Reference Example 1 (the amount of m-phenylenediamine in the membrane: 100 mg/m²), 2500 mg/L of an aqueous sodium nitrite solution (30° C.) whose pH was adjusted to 3 with sulfuric acid was applied at a rate of 500 mL/m² for 45 seconds (the modification process B→the modification process A). Thereafter, the excess reagent was washed off with purified water, and the membrane was immersed in an aqueous sodium sulfite solution (1000 mg/L) for 3 minutes to obtain a composite semipermeable membrane. The membrane performance is shown in Table 1.

Comparative Example 1

A composite semipermeable membrane was obtained in the same manner as in Example 1 except that the composite semipermeable membrane obtained in Reference Example 1 was used and that an aqueous sodium nitrite solution was applied to the nonwoven fabric surface (corresponding to the back side in Example 1) of the composite semipermeable membrane. The membrane performance is shown in Table 1.

Comparative Example 2

A composite semipermeable membrane was obtained in the same manner as in Example 1 except that the composite semipermeable membrane obtained in Reference Example 1 was used and immersed in an aqueous sodium nitrite solution for 45 seconds. The membrane performance is shown in Table 1.

Example 2

To the surface of the functional layer of the composite semipermeable membrane obtained in Reference Example 1, an aqueous sodium nitrite solution was applied in the same manner as in Example 1. The excess reagent was washed off with purified water, and the membrane was immersed in an aqueous phloroglucinol (1,3,5-trihydroxybenzene) solution (1000 mg/L) for 3 minutes to obtain a composite semipermeable membrane. The membrane performance is shown in Table 1.

Example 3

A composite semipermeable membrane was obtained in the same manner as in Example 2 except that an aqueous sodium nitrite solution was applied in the same manner as in Example 1 to the surface of the functional layer of the composite semipermeable membrane obtained in Reference Example 1 and that an aqueous phloroglucinol (1,3,5-trihydroxybenzene) solution was applied, after washing, to the nonwoven fabric surface of the composite semipermeable membrane at a rate of 500 mL/m² for 45 seconds. The membrane performance is shown in Table 1.

Example 4

To the surface of the separating functional polyamide layer of the composite semipermeable membrane obtained in Reference Example 2 (the amount of m-phenylenediamine in the membrane: 4.8 mg/m²), 2500 mg/L of an aqueous sodium nitrite solution (30° C.) whose pH was adjusted to 3 with sulfuric acid was applied at a rate of 500 mL/m² for 45 seconds (the modification process A). Thereafter, the excess reagent was washed off with purified water, and the membrane was immersed in an aqueous sodium sulfite solution (1000 mg/L) for 3 minutes to obtain a composite semipermeable membrane. The membrane performance is shown in Table 1.

Comparative Example 3

A composite semipermeable membrane was obtained in the same manner as in Example 1 except that the composite semipermeable membrane obtained in Reference Example 2 was used and that an aqueous sodium nitrite solution was applied to the nonwoven fabric surface (corresponding to the back side in Example 1) of the composite semipermeable membrane. The membrane performance is shown in Table 1.

Comparative Example 4

A composite semipermeable membrane was obtained in the same manner as in Example 1 except that the composite semipermeable membrane obtained in Reference Example 2 was used and immersed in an aqueous sodium nitrite solution for 45 seconds. The membrane performance is shown in Table 1.

Example 5

A composite semipermeable membrane was obtained in the same manner as in Example 1 except that the composite semipermeable membrane obtained in Reference Example 3 (the amount of m-phenylenediamine in the membrane: 137 mg/m²) was used. The membrane performance is shown in Table 1.

TABLE 1

| | Contact surface of modification process A | Chemical compound(s) used in modification process B | Contact surface of modification process B | Permeate flow rate of water ($m^3/m^2/day$) | Permeate flow ratio compared to Reference Example 1 |
|---|---|---|---|---|---|
| Reference Example 1 | — | — | — | 0.83 | — |
| Example 1 | Feed water surface | m-phenylenediamine | Both surfaces (immersed) | 0.81 | 0.98 |
| Comparative Example 1 | Permeate water surface | m-phenylenediamine | Both surfaces (immersed) | 0.76 | 0.92 |
| Comparative Example 2 | Both sides (immersed) | m-phenylenediamine | Both surfaces (immersed) | 0.78 | 0.94 |
| Example 2 | Feed water surface | m-phenylenediamine, phloroglucinol | Both surfaces (immersed) | 0.81 | 0.98 |
| Example 3 | Feed water surface | m-phenylenediamine, phloroglucinol | Feed water surface | 0.84 | 1.01 |
| Example 4 | Feed water surface | — | — | 0.89 | 1.07 |
| Comparative Example 3 | Permeate water surface | — | — | 0.78 | 0.94 |
| Comparative Example 4 | Both surfaces (immersed) | — | — | 0.85 | 1.02 |
| Example 5 | Feed water | m-phenylenediamine, | Feed water | 0.80 | 1.01 |

| | Salt removal rate (%) | Salt removal rate ratio compared to Reference Example 1 | Boron removal rate (%) | Boron removal rate ratio compared to Reference Example 1 | $X_A$ | $X_B$ | $Y_A$ | $Y_B$ |
|---|---|---|---|---|---|---|---|---|
| Reference Example 1 | 99.8 | — | 91.2 | — | — | — | — | — |
| Example 1 | 99.8 | 1.00 | 93.9 | 0.69 | 0.20 | 0.78 | 0.71 | 0.17 |
| Comparative Example 1 | 99.7 | 1.50 | 92.5 | 0.85 | 0.51 | 0.38 | 0.46 | 0.47 |
| Comparative Example 2 | 99.8 | 1.00 | 94.0 | 0.68 | 0.38 | 0.35 | 0.49 | 0.50 |
| Example 2 | 99.8 | 1.00 | 94.0 | 0.68 | 0.09 | 0.67 | 0.76 | 0.16 |
| Example 3 | 99.8 | 1.00 | 93.5 | 0.74 | 0.09 | 0.80 | 0.82 | 0.13 |

TABLE 1-continued

| | | | | | | | | |
|---|---|---|---|---|---|---|---|---|
| Example 4 | 99.8 | 1.00 | 91.5 | 0.97 | 0.16 | 0.57 | 0.25 | 0.08 |
| Comparative Example 3 | 99.7 | 1.50 | 90.8 | 1.05 | 0.28 | 0.18 | 0.10 | 0.12 |
| Comparative Example 4 | 99.7 | 1.50 | 90.7 | 1.06 | 0.24 | 0.23 | 0.10 | 0.10 |
| Example 5 ※ | 99.8 | 1.00 | 90.3 | 0.96 | 0.23 | 0.52 | 0.60 | 0.13 |

※:Permeate flow ratio and removal rate ratios of Example 5 mean ratios compared to reference Example 3, respectively.

As can be seen from Table 1, in Comparative Examples which are well known in the art, it is difficult to simultaneously achieve a high permeate flow rate and high solute removal properties. On the other hand, in Examples in which $X_A$, the ratio of the amino groups (molar equivalent of the amino groups/(molar equivalent of the azo groups+molar equivalent of the phenolic hydroxyl groups+molar equivalent of the amino groups)) on the A surface, is in the range 0.5 or less; and $X_B$, the ratio of the amino groups (molar equivalent of the amino groups/(molar equivalent of the azo groups+ molar equivalent of the phenolic hydroxyl groups+molar equivalent of the amino groups)) on the B surface, is in the range of 0.5 to 1.0, a high permeate flow rate and high solute removal properties were achieved. Further, it was shown that $Y_A$, the ratio of the azo groups (molar equivalent of the azo groups/(molar equivalent of the phenolic hydroxyl groups+ molar equivalent of the azo groups)) on the A surface, is larger than $Y_B$, the ratio of the azo groups (molar equivalent of the azo groups/(molar equivalent of the phenolic hydroxyl groups+molar equivalent of the azo groups)) on the B surface (that is, $Y_A > Y_B$) and that the durability to an oxidizing agent and organic matter improves with increasing value of $Y_A$.

INDUSTRIAL APPLICABILITY

The composite semipermeable membrane of the present invention has high permeability and selective separation properties, allows obtaining drinking water from sea water, brackish water, and water containing harmful substances, and, in addition, can been used, for example, in production of industrial ultrapure water, wastewater treatment, and recovery of valuables.

DESCRIPTION OF SYMBOLS

1: Porous support membrane
1a: Porous support layer
1b: Anchoring portion
2: Porous support
2a: Front-side surface
2b: Back-side surface
2c: Convex
2d: Recess
2e: Hole
2f: Coarse layer

The invention claimed is:

1. A composite semipermeable membrane comprising a porous support membrane on which a separating functional polyamide layer is formed by a polycondensation reaction of a polyfunctional aromatic amine with a polyfunctional acid halide,
   wherein the separating functional polyamide layer has carboxy groups, amino groups, phenolic hydroxyl groups, and azo groups,
   wherein $X_A$ is the ratio of the amino groups (molar equivalent of amino groups)/(molar equivalent of azo groups+ molar equivalent of phenolic hydroxyl groups+molar equivalent of amino groups) on a feed water contact "A" surface of the separating functional polyamide layer, and $X_A$ is in the range 0.5 or less, and
   $X_B$ is the ratio of the amino groups (molar equivalent of the amino groups)/(molar equivalent of azo groups+molar equivalent of phenolic hydroxyl groups+molar equivalent of amino groups) on a permeate-side "B" surface of the separating functional polyamide layer, and $X_B$ is in the range of 0.5 to 1, the A and B surfaces being on opposite sides of the composite semipermeable membrane.

2. The composite semipermeable membrane according to claim 1, wherein $Y_A$ is the ratio of the azo groups (molar equivalent of azo groups)/(molar equivalent of phenolic hydroxyl groups+molar equivalent of azo groups) on said A surface, and $Y_A$ is larger than $Y_B$ which is the ratio of the azo groups (molar equivalent of azo groups)/(molar equivalent of phenolic hydroxyl groups+molar equivalent of azo groups) on said B surface.

3. The composite semipermeable membrane according to claim 2, said composite semipermeable membrane having a porous support membrane wherein a porous support layer is formed on a front-side surface of a porous support member having a coarse back side,
   wherein the porous support layer extends into said porous support member,
   wherein the porous support member is a woven fabric, nonwoven fabric, or net having a back side with a density lower than the front side density, and
   wherein the porous support layer extends to a region from a back-side surface of the porous support member to 50% of the total thickness.

4. The composite semipermeable membrane according to claim 3, wherein the polyfunctional aromatic amine is selected from the group consisting of m-phenylenediamine, p-phenylenediamine, 1,3,5-triaminobenzene, N,N-dimethyl m-phenylenediamine, N,N-diethyl m-phenylenediamine, N,N-dimethyl p-phenylenediamine, and N,N-diethyl p-phenylenediamine.

5. The composite semipermeable membrane according to claim 3, wherein the polyfunctional acid halide is selected from the group consisting of an acid halide of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid.

6. The composite semipermeable membrane according to claim 2, wherein the polyfunctional aromatic amine is selected from the group consisting of m-phenylenediamine, p-phenylenediamine, 1,3,5-triaminobenzene, N,N-dimethyl m-phenylenediamine, N,N-diethyl m-phenylenediamine, N,N-dimethyl p-phenylenediamine, and N,N-diethyl p-phenylenediamine.

7. The composite semipermeable membrane according to claim 2, wherein the polyfunctional acid halide is selected from the group consisting of an acid halide of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid.

8. The composite semipermeable membrane according to claim 1, said composite semipermeable membrane having a porous support membrane wherein a porous support layer is formed on a front-side surface of a porous support member having a coarse back side,
   wherein the porous support layer extends into said porous support member,
   wherein the porous support member is a woven fabric, nonwoven fabric, or net having a back side with a density lower than the front side density, and
   wherein the porous support layer extends to a region from a back-side surface of the porous support member to 50% of the total thickness.

9. The composite semipermeable membrane according to claim 8, wherein the polyfunctional aromatic amine is selected from the group consisting of m-phenylenediamine, p-phenylenediamine, 1,3,5-triaminobenzene, N,N-dimethyl m-phenylenediamine, N,N-diethyl m-phenylenediamine, N,N-dimethyl p-phenylenediamine, and N,N-diethyl p-phenylenediamine.

10. The composite semipermeable membrane according to claim 8, wherein the polyfunctional acid halide is selected from the group consisting of an acid halide of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid.

11. The composite semipermeable membrane according to claim 1, wherein the polyfunctional aromatic amine is selected from the group consisting of m-phenylenediamine, p-phenylenediamine, 1,3,5-triaminobenzene, N,N-dimethyl m-phenylenediamine, N,N-diethyl m-phenylenediamine, N,N-dimethyl p-phenylenediamine, and N,N-diethyl p-phenylenediamine.

12. The composite semipermeable membrane according to claim 11, wherein the polyfunctional acid halide is selected from the group consisting of an acid halide of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid.

13. The composite semipermeable membrane according to claim 1, wherein the polyfunctional acid halide is selected from the group consisting of an acid halide of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid.

14. A method of producing a composite semipermeable membrane comprising a porous support membrane on which a separating functional polyamide layer is formed by a polycondensation reaction of a polyfunctional amine with a polyfunctional acid halide, wherein the separating functional polyamide layer has carboxy groups, amino groups, phenolic hydroxyl groups, and azo groups, wherein $X_A$ is the ratio of the amino groups (molar equivalent of amino groups)/(molar equivalent of azo groups+molar equivalent of phenolic hydroxyl groups+molar equivalent of amino groups) on a feed water contact "A" surface of the separating functional polyamide layer and $X_A$ is in the range 0.5 or less,
   wherein the method comprises a modification process A in which a solution containing a compound that reacts with primary aromatic amino groups in said separating functional polyamide layer and forms a diazonium salt or derivatives thereof is contacted only with a feed water contact front surface of the separating functional polyamide layer.

15. The method of producing the composite semipermeable membrane according to claim 14, further comprising a modification process B in which a solution containing a compound having reactivity with a diazonium salt or derivatives thereof is contacted with the composite semipermeable membrane subsequently to the modification process A or simultaneously with the modification process A.

16. The method of producing the composite semipermeable membrane according to claim 14, wherein $X_B$ is the ratio of the amino groups (molar equivalent of the amino groups)/(molar equivalent of azo groups+molar equivalent of phenolic hydroxyl groups+molar equivalent of amino groups) on a permeate-side "B" surface of the separating functional polyamide layer, and $X_B$ is in the range of 0.5 to 1, the A and B surfaces being on opposite sides of the composite semipermeable membrane.

* * * * *